United States Patent
Altman

[11] 4,087,161
[45] May 2, 1978

[54] LENS

[75] Inventor: Richard M. Altman, Woodland Hills, Calif.

[73] Assignee: Vivitar Corporation, Santa Monica, Calif.

[21] Appl. No.: 692,550

[22] Filed: Jun. 3, 1976

[51] Int. Cl.² .............................................. G02B 9/60
[52] U.S. Cl. .................................... 350/217; 350/176; 350/209
[58] Field of Search ................. 350/217, 176, 209, 216

[56] References Cited

U.S. PATENT DOCUMENTS

| 871,559 | 11/1907 | Beck | 350/216 |
|---|---|---|---|
| 2,383,115 | 8/1945 | Durand | 350/217 |
| 3,486,810 | 12/1969 | Hoogland | 350/217 |

FOREIGN PATENT DOCUMENTS

| 927,898 | 6/1963 | United Kingdom | 351/217 |
|---|---|---|---|
| 537,237 | 6/1941 | United Kingdom | 350/217 |

*Primary Examiner*—Paul A. Sacher
*Attorney, Agent, or Firm*—DeLio and Montgomery

[57] ABSTRACT

A lens of five elements comprising a first bi-convex element, a second meniscus element, a third bi-concave element, a fourth meniscus element, and a fifth bi-convex element with an aperture stop between the meniscuses and the concave surfaces of the meniscuses facing the aperture.

1 Claim, 5 Drawing Figures

LENS

This invention relates to photographic lens and more particularly relates to a wide aperture, low cost, well corrected lens.

In many cases a lens designer, given performance specifications for a new lens, will commence with a known basic lens form for specified relative aperture, equivalent focal length, field angle, etc. If the lens is to have a relative aperture of no greater than f/2.8 and a semi-field angle of twenty degrees or less, the probable starting point will be a four-element Tessar form. The Tessar form is a derivative of the Cooke triplet, and permits a wider relative aperture and slightly greater field angle than the triplet.

If a relative aperture of f/2.0 or wider for the same range of field angles is specified, the designer will undoubtedly choose a double Gauss form, which requires six elements to be well corrected. This well-known form has nearly symmetrical surfaces concave to the aperture stop on a relatively small radii. This together with the requirement for six elements results in a relatively expensive lens, if it is to be well corrected. The double Gauss form can be and often is used for lenses of relative aperture of f/1.4 and wider.

The present invention provides a new and improved lens form which permits a well-corrected lens of five elements which may be used for lenses of f/1.8 relative aperture and semi-field angles of twenty-two degrees or greater. A lens embodying the invention does not require any relatively strong surface curvatures, and may be constructed of only three types of glass. This substantially decreases the cost of manufacture of the lens. Additionally, the lens may be designed so that only the front two elements move for focusing with the aperture stationary, thus further reducing the cost of the lens.

Briefly stated, a lens embodying the invention in one form thereof comprises a first positive element, a second meniscus element convex to the object, a third bi-concave element, a fourth meniscus element concave to the object and a fifth bi-convex element. The aperture stop is disposed between the two meniscuses whose facing surfaces are concave.

An object of this invention is to provide a new lens form of wide relative aperture and decreased cost.

The features of the invention which are believed to be novel are particularly pointed out and distinctly claimed in the concluding portion of this specification. However, the invention both as to its arrangement and organization, together with further objects and advantages thereof may best be appreciated by reference to the following detailed descriptions taken in conjunction with the drawings, wherein:

A lens embodying the invention comprises five elements L1–L5 having radii R1–R10 as hereinafter described.

Element L1 is a positive bi-convex element. Element L2 is a relatively thick meniscus convex to the object and of small negative power. Element L3 is a bi-concave element having a high index of refraction and high dispersion (low Abbe number). Element L3 is bi-concave and makes the predominant negative power contribution to the lens. Element L4 is a relatively thick positive meniscus concave to the object. Element L5 is bi-convex. The facing surfaces R4 and R7 of elements L2 and L4 are concave toward an aperture defining iris A. In the embodiment shown, the aperture is positioned between elements L2 and L3.

Figure 1:
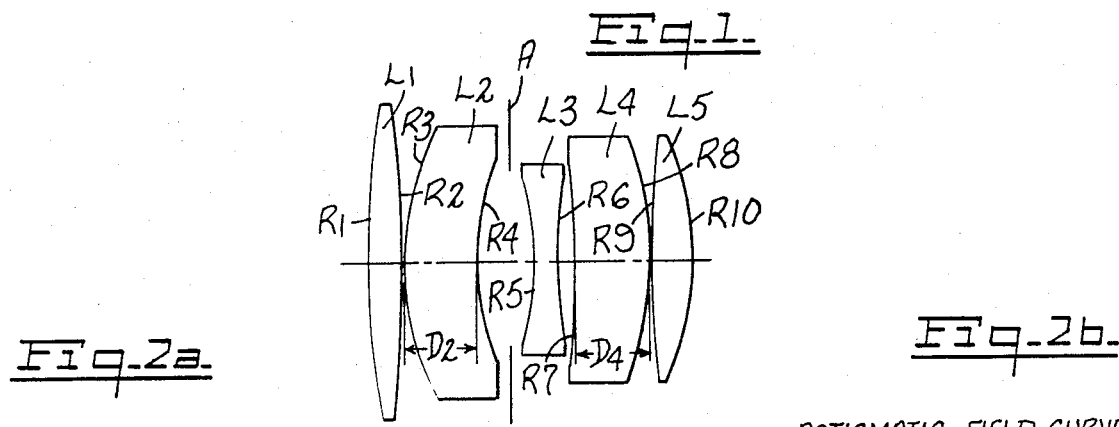
FIG. 1 is a schematic side elevation of a lens embodying the invention.

The facing concave surfaces R4 and R7 are both defined on radii greater than one-half the equivalent focal length of the lens. The lens of FIG. 1, as scaled to a 50mm equivalent focal length (EFL) with a relative aperture of f/2.0 and a semi-field angle of 23.2°, is substantially described in Table I.

TABLE I

| Lens | | Surface Radius (mm) | Axial Distance Between Surfaces | $N_d$ | $V_d$ |
|---|---|---|---|---|---|
| L2 | R1 | 59.337 | | | |
| | | | 3.334mm | 1.697 | 55.5 |
| | R2 | −287.040 | | | |
| L2 | R3 | 30.166 | 0.200 | | |
| | | | 8.545 | 1.697 | 55.5 |
| | R4 | 30.948 | | | |
| | | | 6.296 | | |
| L3 | R5 | −30.318 | | | |
| | | | 2.227 | 1.847 | 23.8 |
| | R6 | 49.594 | | | |
| | | | 1.817 | | |
| L4 | R7 | −82.027 | | | |
| | | | 9.000 | 1.804 | 46.5 |
| | R8 | −37.206 | | | |
| | | | 0.200 | | |
| L5 | R9 | 126.618 | | | |
| | | | 4.602 | 1.804 | 46.5 |
| | R10 | −38.708 | | | |

BFL = 39.043mm
L1–L5 are lens elements from the object to image side, R1–R10 are the surface radii of elements L1–L5, $N_d$ is the index of refraction, and $V_d$ is the Abbe number.

In the embodiment shown only the front two elements L1 and L2 move for focusing to a distance of 0.9 meter from L1. The close focusing distance may be decreased by moving all elements.

Figure 2A:
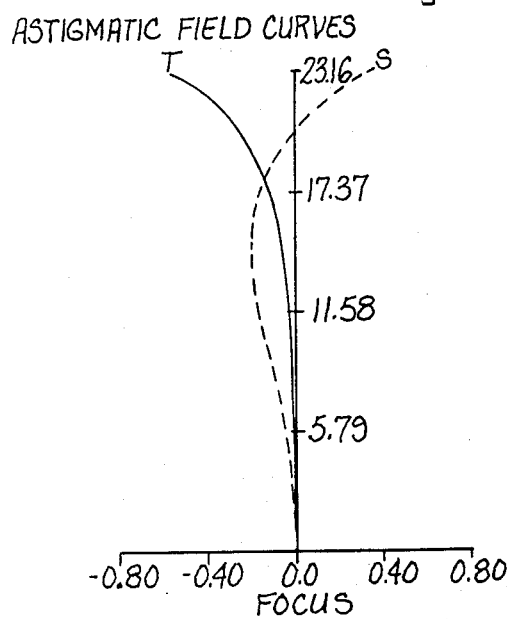
FIGS. 2a and 2b are plots of astigmatic field curves for the lens of FIG. 1 at infinity and about one meter.
Figure 2B:
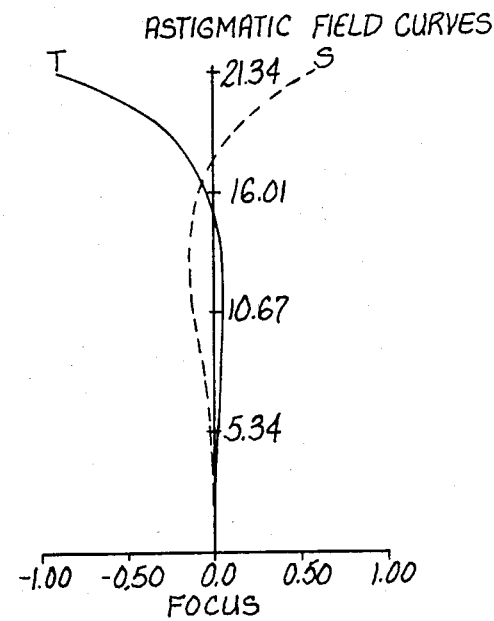

FIGS. 2a and 2b evidence the good correction for astigmatism provided for this lens at infinity and 0.9 meter, respectively. The ordinate is image height on the image frame half diagonal measured from the center (24×36mm format), and the abscissa is in millimeters.

Figure 3A:
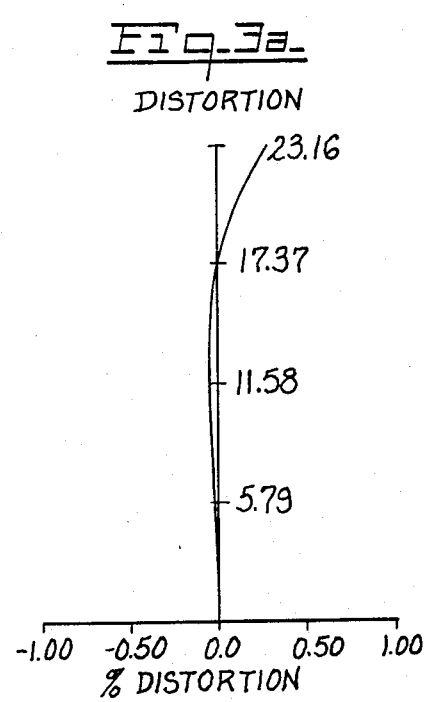
FIGS. 3a and 3b are plots of distortion for the lens of FIG. 1 at infinity and about one meter.
Figure 3B:
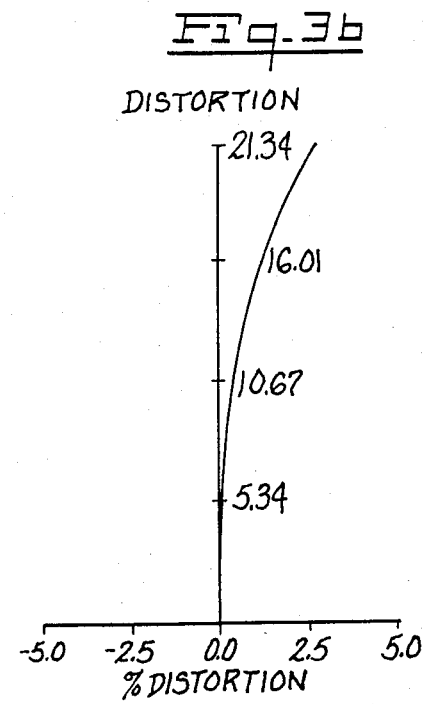

FIGS. 3a and 3b evidence the good correction for distortion at infinity and 0.9 meter. The ordinate and abscissa are the same as before.

The curves S and T represent saggital (S) and tangential (T) fans of light.

It will be noted from Table I that the facing radii $R_4$ and $R_7$ are both greater than 60 percent of the EFL and both of elements L2 and L4 have an axial thickness of over 15 percent of the EFL.

This may be expressed as $$R_4 > 0.6 F_o$$

$$|R_7| > 0.6 F_o$$

$$D_2 \leq 0.15 F_o$$

$$D_4 \leq 0.15 F_o$$

where $R_4$ and $R_7$ are the facing surface radii of elements L2 and L4, $D_2$ is the thickness of element L2 at the optical axis, $D_4$ is the thickness of element L4 at the optical axis and $F_o$ is the equivalent focal length of the lens.

No lens element has a surface radius less than 0.60 of the equivalent focal length of the overall lens. Only three glass types are used, L1 and L2 being the same, and L4 and L5 being the same. This leads to substantially reduced cost per unit lens in grinding the elements in multiple.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in in the art. Accordingly, the appended claims are intended to cover all embodiments of the invention and modifications to the disclosed embodiments which do not depart from the spirit and scope of the invention.

What is claimed is:

1. A lens having five elements from object to image end comprising a first positive element, a second meniscus element concave to the image end, a third bi-concave element, a fourth meniscus element concave to the object end, and a fifth double convex element, said lens being defined substantially as follows as scaled to an equivalent focal length of 50mm, and a semi-field angle of 23.2°:

| Lens | | Surface Radius (mm) | Axial Distance Between Surfaces | $N_d$ | $V_d$ |
|---|---|---|---|---|---|
| L1 | R1 | 59.337 | | 1.697 | 55.5 |
| | R2 | −287.040 | 3.334mm | | |
| | | | 0.200 | | |
| L2 | R3 | 30.166 | 8.545 | 1.697 | 55.5 |
| | R4 | 30.948 | | | |
| | | | 6.296 | | |
| L3 | R5 | −30.318 | 2.227 | 1.847 | 23.8 |
| | R6 | 49.594 | | | |
| | | | 1.817 | | |
| L4 | R7 | −82.027 | 9.000 | 1.804 | 46.5 |
| | R8 | −37.206 | | | |
| | | | 0.200 | | |
| L5 | R9 | 126.618 | 4.602 | 1.804 | 46.5 |
| | R10 | −38.708 | | | |

Where $N_d$ is the index of refraction, $V_d$ is the Abbe number, L1–L5 are the lens elements from object to image end, and R1–R10 are the surface radii of elements L1–L5.

* * * * *

UNITED STATES PATENT AND TRADEMARK OFFICE
CERTIFICATE OF CORRECTION

PATENT NO. : 4,087,161
DATED : May 2, 1978
INVENTOR(S) : Richard M. Altman

It is certified that error appears in the above-identified patent and that said Letters Patent are hereby corrected as shown below:

Column 2, Table I, far right column heading, "$N_d$" should read --$V_d$--.

Column 2, before line 60, third equation should be changed to --$D_2 \geq 0.15 F_0$--, and fourth equation should be changed to --$D_4 \geq 0.15 F_0$--.

Signed and Sealed this

Twelfth Day of September 1978

[SEAL]

Attest:

RUTH C. MASON
*Attesting Officer*

DONALD W. BANNER
*Commissioner of Patents and Trademarks*